(12) United States Patent
Kobayashi et al.

(10) Patent No.: US 6,611,620 B1
(45) Date of Patent: Aug. 26, 2003

(54) REVERSIBLE CODING METHOD, REVERSIBLE CODING APPARATUS, AND MEMORY MEDIUM USED THEREIN

(75) Inventors: Masaaki Kobayashi, Fukuoka (JP); Mutsuaki Noma, Fukuoka (JP); Seiichiro Hiratsuka, Fukuoka (JP)

(73) Assignee: Matsushita Electric Industrial Co. Ltd., Osaka (JP)

( * ) Notice: Subject to any disclaimer, the term of this patent is extended or adjusted under 35 U.S.C. 154(b) by 0 days.

(21) Appl. No.: 09/384,616

(22) Filed: Aug. 27, 1999

(30) Foreign Application Priority Data

Aug. 28, 1998 (JP) .............................. 10-243136
Sep. 9, 1998 (JP) .............................. 10-255020

(51) Int. Cl.[7] .............................. G06K 9/36; G06K 9/46
(52) U.S. Cl. .................... 382/166; 382/238; 382/251
(58) Field of Search ................................ 382/166, 238, 382/244–247, 251; 358/426.13; 341/106, 107

(56) References Cited

U.S. PATENT DOCUMENTS 5,764,374 A * 6/1998 Seroussi et al. ............ 382/244
5,956,467 A * 9/1999 Rabbani et al. ............. 382/166

\* cited by examiner

*Primary Examiner*—Timothy M. Johnson
(74) *Attorney, Agent, or Firm*—RatnerPrestia

(57) ABSTRACT

Still color image data is separated into plural planes, and pixels of each plane are processed predictive coding within plane and/or between planes, and the predictive error data is modified by using the correlation of predictive errors within plane and/or between planes, and the modified data is coded by entropy coding so as to curtail the quantity of data, thereby realizing high speed and efficient predictive coding.

7 Claims, 15 Drawing Sheets

X: Pixel of notice
Xp: Predictive value
a,b,c,d,e: Reference pixel
X−Xp: Predictive error Previous-sample prediction:   Xp=e
Matrix prediction:             Xp=(b+e)/2
Plane prediction:              Xp=b+e−a
Average prediction:            Xp=(b+c)/2
Slant prediction:              Xp=2e−d

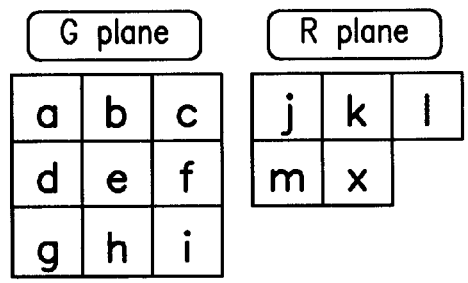

Predicted by using values of a to m.

Coding of R plane

X: Pixel of notice

Xp: Predictive value a,b,c,d,e,f,g,h,i,j,k,l,m: Reference pixel

X-Xp: Predictive error

FIG. 5

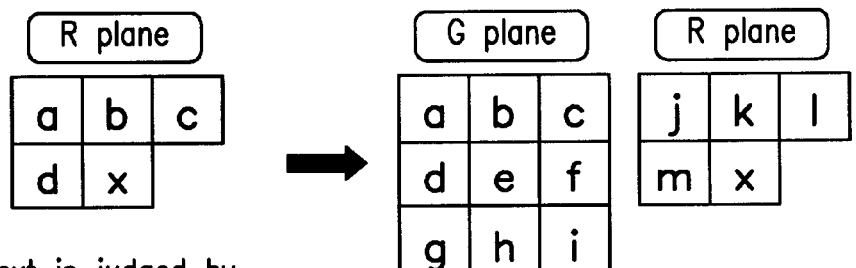

Context is judged by using values of a to d, and prediction formula is determined.

Coding of G plane

X: Pixel of notice a,b,c,d: Reference pixel

Context is judged by using values of a to m, and prediction formula is determined.

Coding of R plane

X: Pixel of notice a,b,c,d,e,f,g,h,i,j,k,l,m: Reference pixel

FIG. 6

$f_R(e_G) = -\bar{e}_R(e_G)$ $\bar{e}_R$: Average of predictive errors of R plane $\bar{e}_B$: Average of predictive errors of B plane X: Pixel to be coded
Xp: Predictive value
a,b,c,d: Reference pixel or its pixel value
e(=x−Xp): Predictive error Previous-sample prediction:   $X_p = d$
Matrix prediction:            $X_p = (b+d)/2$
Plane prediction:             $X_p = b+d-a$
Average prediction:           $X_p = (b+c)/2$ X: Pixel to be coded $D = |e_a| + |e_b| + |e_c| + |e_d|$ Predictive error of pixels a,b,c,d:   $e_a, e_b, e_c, e_d$
Predictive error intensity:   D Quantizing level: $L_1, L_2, L_3$
Cumulative appearance frequency: $S_1, S_2, S_3$
Quantizing threshold: $\theta_1, \theta_2, \theta_3$ $S_1 = S_2 = S_3$

REVERSIBLE CODING METHOD, REVERSIBLE CODING APPARATUS, AND MEMORY MEDIUM USED THEREIN

FIELD OF THE INVENTION

The present invention relates to a reversible coding method for coding color image digital data without deterioration, a reversible coding apparatus using this method, and a memory medium storing a program for controlling this apparatus.

BACKGROUND OF THE INVENTION

Recently, when using medical data or image data in diagnosis, or when processing received image by edge enhancement or color correction and transmitting again, images of high quality are required, and there is an increasing need for reversible coding method which is an image coding method completely free from deterioration of image quality in still image or high definition image.

Herein, reversible coding of image data may be roughly composed of two processing blocks. A first block is an image data modeling portion, and a second block is an entropy coding portion. The image data modeling portion is intended to modify the image data into a data string easy to be coded, and the entropy coding portion is intended to assign the modified data string actually with a shortest possible code to create coded data.

Hitherto, such reversible coding method includes JPEG Loss-Less mode as the international standard coding method of still image, or JPEG-LS or JPEG2000 in the process of standardization. These coding methods are basically intended to determine the predictive error by predictive coding in the modeling portion of the image data, and processing the predictive error by Huffman coding or arithmetic coding in the entropy coding portion. Therefore, the key in enhancement of compression rate lies in how small the predictive error can be controlled in the image data modeling portion. Accordingly, in the image data modeling portion, it is attempted to enhance the prediction precision by using the context of the peripheral pixel information of the coded pixels and the like.

A general reversible coding method of color image digital data is described below. FIG. 22 is a structural diagram of a general reversible coding apparatus for RGB data. FIG. 23 is a diagram showing the flow of general processing of reversible coding of RGB data.

The flow of processing is explained by referring to FIG. 22 and FIG. 23. When RGB data is entered from input means 102, plane separating means 103 separates the RGB data into R plane data, G plane data, and B plane data (S201).

In the data of each separated plane, predictive coding means 104 predicts and codes in each plane (S202 to S204).

Further, context separating means 105 refers to the pixel values of the peripheral pixels of the pixels to be coded as shown in FIG. 24, and determines the context of the pixels to be coded (S205 to S207).

Entropy coding means 106 codes by entropy the predictive error data of R, G, B planes issued from the predictive coding means 104 in the condition optimally set in the context determined in the preceding steps S205 to S207 (S208 to S210).

Finally, thus coded data is issued from coded data output means 107.

These processes are controlled by the program stored in the control means 101.

In the conventional method, however, since the coding is operated independently in the plane unit, that is, in each plane, in the case of color image data having a correlation between planes, it is difficult to enhance the coding efficiency by using the correlation. Yet, such general reversible coding method is intended to determine the context by referring to the pixel values of the peripheral pixels of the pixels to be coded, therefore the number of states of the context increases, and the quantity of calculation and capacity of memory are enormous, or if the context is determined using quantized pixel values in order to decrease the number of states of the context, it is impossible to separate into groups of predictive errors by context with sufficient precision, and it is hence hard to realize the practical context separation in order to enhance the coding efficiency.

The invention is intended to solve these problems, and it is hence an object thereof to present a reversible coding method and a reversible coding apparatus in high in coding efficiency by realizing modification of predictive error for curtailing the quantity of data by using correlation between planes of values of pixels and/or predictive errors and practical context separation, and also to present a memory medium for storing the program for controlling such apparatus.

SUMMARY OF THE INVENTION

To solve the problems, the invention is intended to separate color image data into plural planes suited to coding, processing predictive coding of the data within plane or between planes in every plane, and to modify the predictive error data by using correlation between planes, and to process the modified predictive error data by entropy coding. In particular, when the input image is RGB data, the RGB data is separated into R plane, G plane and B plane, and by using the predictive error of G plane having a strong correlation with other plane, the data of predictive error of R plane and B plane is modified. According to the invention, the predictive error is separated into groups by the context, and entropy coding suited to each separated group is executed. In particular, this method is to determine the context by using the predictive error of coded peripheral pixels when separating by the context, and to separate the predictive error into groups by the context, and therefore the correlation between planes can be utilized sufficiently and a more practical context separation is realized, so that a reversible coding method of high coding efficiency is obtained.

The reversible coding apparatus of the invention comprises predictive coding means for processing predictive coding of color image data in every plane, predictive error modifying means for modifying the predictive error data by using correlation of predictive error between planes, and entropy coding means for coding by entropy the modified predictive error data. In particular, when the input image is RGB data, this apparatus comprises predictive error modifying means for modifying the predictive error of R plane and B plane by using the predictive error of G plane. The apparatus further comprises context separating means for separating the predictive error data by every context, and entropy coding means set optimally in every context, and especially by using the context separating means for separating the context by using the predictive error of coded peripheral pixels, the correlation between the planes can be utilized sufficiently, and more practicable context separation is realized.

Thus, the apparatus of the invention presents reversible coding of high speed and high coding efficiency.

BRIEF DESCRIPTION OF THE DRAWINGS

FIG. 5 is an explanatory diagram of predictive coding by using plane correlation.

FIG. 6 is an explanatory diagram of context model by using plane correlation.

FIG. 7 (b) is an exemplary diagram of average value of predictive errors of pixels of R plane at positions corresponding to the pixels having the same predictive error of G plane.

DESCRIPTION OF THE PREFERRED EMBODIMENTS

(1) EMBODIMENT 1

Figure 1:
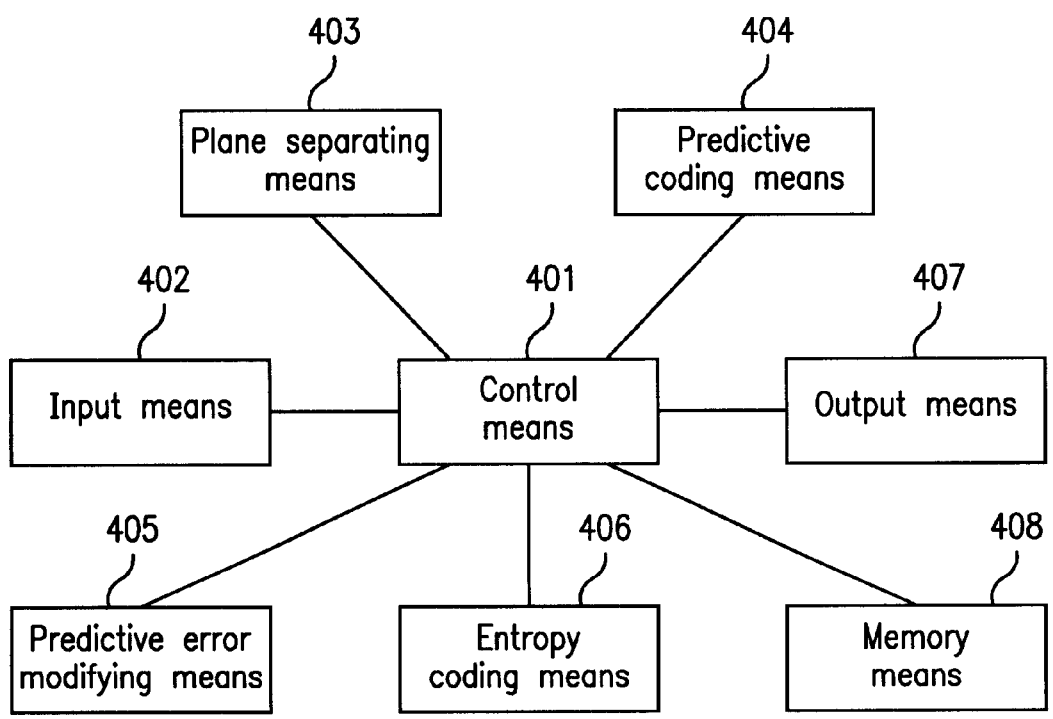
FIG. 1 is a structural diagram of a reversible coding apparatus in embodiment 1 of the invention.
Figure 2:
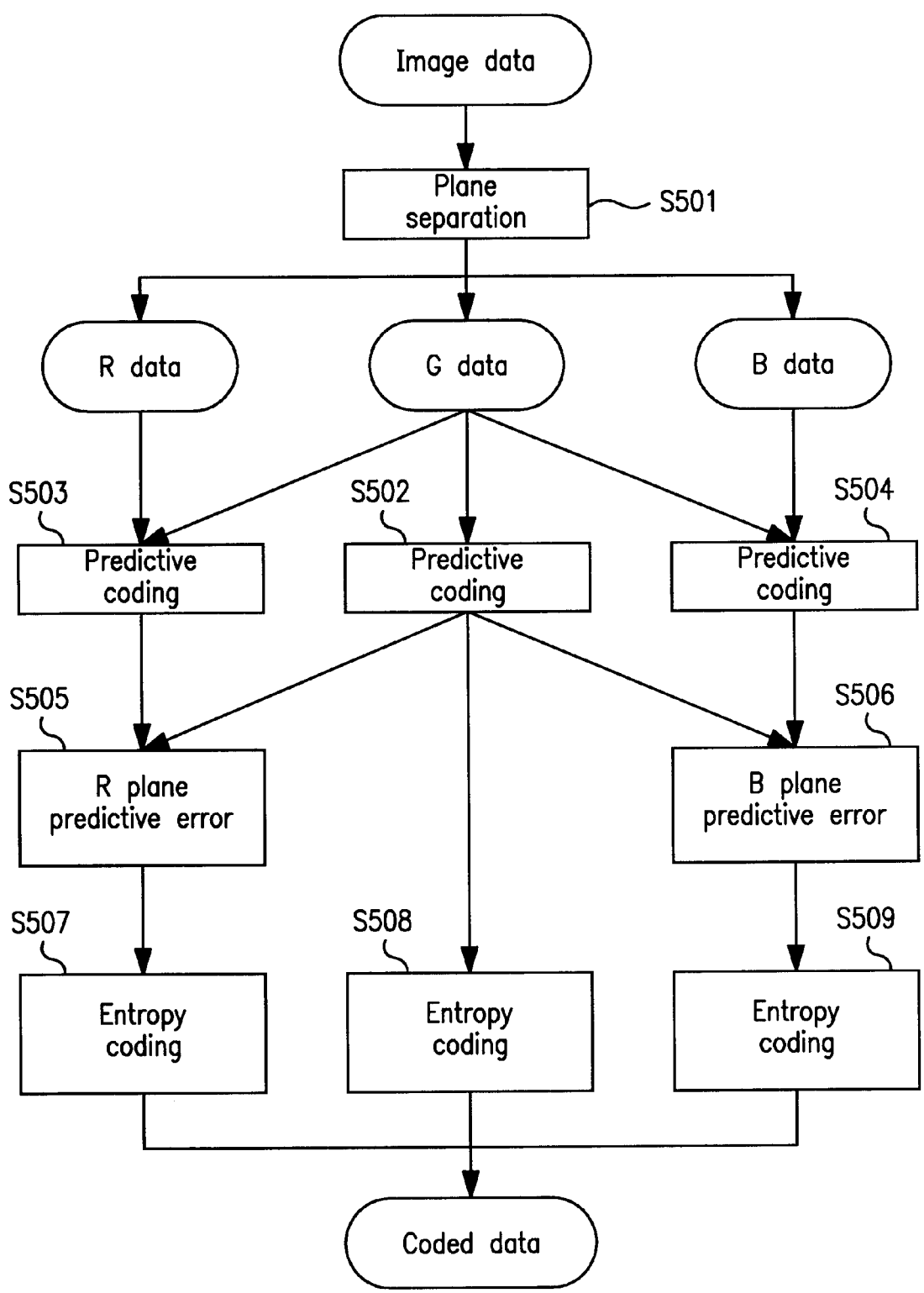
FIG. 2 is a flowchart of reversible coding method in embodiment 1 of the invention.

Embodiment 1 of the invention is described below. FIG. 1 is a structural diagram of a reversible coding apparatus in embodiment 1 of the invention, and FIG. 2 is a flowchart of reversible coding method in embodiment 1 of the invention.

The operation of reversible coding apparatus of color image data according to embodiment 1 is explained below while referring to FIG. 1 and FIG. 2. In this explanation, the input image is RGB data. First, input image data is entered in input means 402. Control means 401 receives the data from the input means 402, and transfers the data to plane separating means 403. The plane separating means 403 modifies the input image data into data of R, G and B planes, and transfers them to the control means 401 (S501).

Next, the control means 401 transfers the image data of G plane to predictive coding means 404, and the predictive coding means 404 processes predictive coding of the G plane by using the peripheral pixel information within plane of G plane, and transfers the predictive error data to the control means 401 (S502). In succession, image data of R plane and image data of G plane are transferred to the predictive coding means 404, and the predictive coding means 404 processes predictive coding of the R plane by using information of the pixel to be coded of the R plane, the pixel of G plane corresponding to its pixel, and its peripheral pixels, and transfers the predictive error data to the control means 401 (S503).

Herein, in some case, the predictive coding within R plane may be higher in coding efficiency because the correlation between the R plane and G plane may be low. In such a case, the data of G plane may not be used in predictive coding.

The data of B plane is processed same as in the step of the R plane (S503), and the predictive error data is transferred to the control means 401 (S504).

Herein, same as in the case of R plane, the data of G plane may not be used in predictive coding.

Consequently, the control means 401 transfers the predictive error data of R plane and predictive error data of G plane to predictive error modifying means 405, and the modifying means 405 for modifying the data modifies the predictive error data of R plane by using the predictive error data of G plane, and transfers the modified predictive error data of R plane to the control means 401 (SS05).

The predictive error data of B plane is processed same as in the step 505 of R plane, and the modified predictive error data of B plane is transferred to the control means 401 (S506). The control means 401 transfers the modified predictive error data of R plane, predictive error data of G plane, and modified predictive error data of B plane sequentially to entropy coding means 406, and coded data are obtained by entropy coding of them (S507 to S509).

Finally, the coded data are issued from output means 407.

The control means 401 may also have memory means 408 for storing the control program for controlling these operations, and the operation of each means may be controlled by the control program stored in the memory means 408.

Each means is specifically described below.

Figure 3:
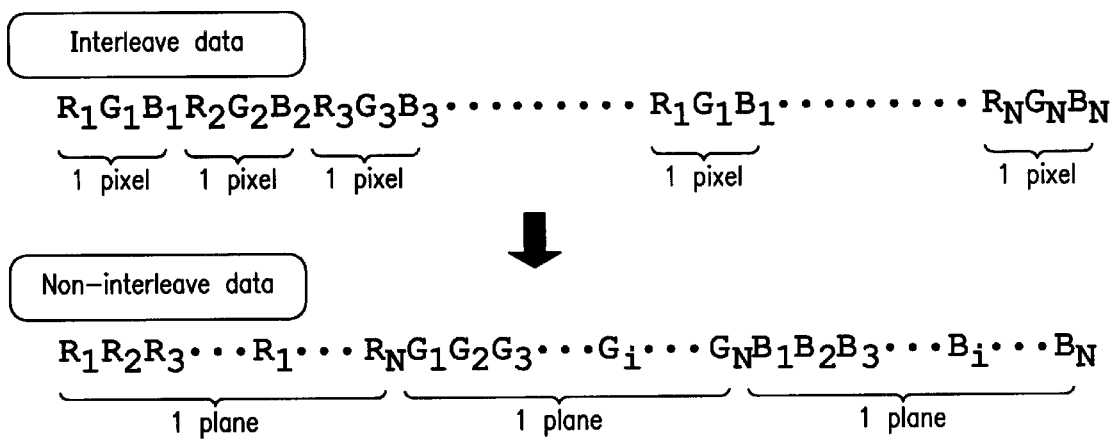
FIG. 3 is an explanatory diagram of plane separation of RGB data.

The plane separating means 403 modifies interleave data into non-interleave data. Wherein, the interleave data is the color image whose pixel is composed of plural pixel values expressing plural color components, and the non-interleave data composed of pixel values expressing the same color component. FIG. 3 is an explanatory diagram of modification of RGB interleave data into RGB non-interleave data. In the interleave data, data are arranged in pixel units, and each color data is arranged in the each pixel data. On the other hand, in the non-interleave data, data are arranged in plane units, and in the plane of a certain color, only the data of the specific color of each pixel is arranged. The plane separating means 403 modifies in this manner, and takes out data in each plane.

The predictive coding means 404 processes predictive coding of each pixel of the plane.

Figure 4:
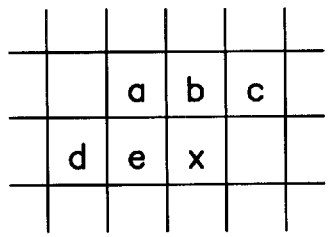
FIG. 4 is an explanatory diagram of predictive coding.

FIG. 4 explains predictive coding by using the data in the plane, that is, it is an explanatory diagram of predictive coding within plane. Using coded peripheral pixel values a to e in the plane, a predictive value Xp of the pixel X to be coded is calculated. This predictive value Xp may be calculated in five methods as shown in formula 1.

(Formula 1)

| | |
|---|---|
| Previous-sample predictive value | Xp = e |
| Matrix predictive value | Xp = (b + e)/2 |
| Plane predictive value | Xp = b + e − a |
| Average predictive value | Xp = (b + c)/2 |
| Slant predictive value | Xp = 2e − d |

The predictive error is the difference between the predictive value Xp and the actual pixel value X. The number of peripheral pixels for calculating the predictive value is not limited to five pixels as shown above.

The predictive coding sequence may include the raster sequence, the data sequence by creating sub-sampling data, and other methods.

As the prediction formula, one method may be fixed out of the five formulas above, or plural formulas may be used to code. And then, the most efficient prediction formula may be selected, or the prediction formula may be changed over depending on the context of the peripheral pixels.

In this case, further, in selection of prediction formula for predictive coding within R plane, the pixel value of the pixel of the coded G plane corresponding to the pixel to be coded in the R plane may be applied to the prediction formula, and the prediction formula of the smallest predictive error may be selected.

FIG. 5 is an explanatory diagram of predictive coding of the pixel data in R plane by using the plane correlation. It is supposed that the predictive coding of G plane has been already done by the method explained in FIG. 4. Predictive coding of R plane is to calculate the predictive value by using the coded peripheral pixel of R plane, the pixel of G plane corresponding to the pixel to be coded in R plane, and the information of its peripheral pixel. One of the calculation formulas is as shown formula 2.

$$Xp = j - \frac{a-e}{b-d}(k-m)$$ (Formula 2)

Herein, the reason why the data of G plane is used as the reference value for calculating the predictive values of R plane and B plane out of RGB data is because the correlation of R plane and G plane and correlation of B plane and G plane are strong, but the correlation is not always strong depending on the images. In such a case, the combination may be changed.

Or, in the color image data using color space other than RGB, the information of the coded plane having strong correlation may be used as reference value in the predictive coding method.

Shown below is the predictive coding method of changing over the prediction formulas depending on the context of the peripheral pixels. FIG. 6 is an explanatory diagram for determining the context model by using the plane correlation. First, the G plane is coded by predictive coding by using the context, then the R plane and B plane are coded by predictive coding by using the context. Since the G plane is coded by predictive coding first, the data of R or B plane cannot be used in coding of G plane. Accordingly, in predictive coding of the G plane, the prediction formula is determined according to the context of the peripheral pixels in the G plane.

In the example in FIG. 6, first, for coding of G plane, the optimum formula is selected out of the prediction formulas in formula 1 according to the context of the four peripheral coded pixels a to d.

Next, the R plane is coded by predictive coding by using the context, and at this time since the coding of the G plane is over, the context is judged by using the information of coded peripheral pixels j,k,l and m of the R plane, pixel of the G plane corresponding to the pixel to be coded in the R plane, and their peripheral pixels a,b,c,r,e,f,g,h and i, and the optimum formula is selected out of the prediction formulas in formula 1 using the context, and coding is executed.

So far is the explanation about predictive coding of R plane, and it is the same for B plane, and its explanation is omitted.

Also herein, same as the predictive coding without using context, the data of G plane is used as the reference value for determining the predictive value of the R plane and B plane, which is because the correlation of R plane and G plane and correlation of B plane and G plane are strong.

Further, as for the color image data using color space other than RGB, the prediction formula may be determined by judging the context by using the information of coded plane having strong correlation.

As the judging method of context model, it may be considered to judge depending on the magnitude relation between the average pixel value of the pixels referring to when judging the context and each pixel value, or the magnitude relation of difference of pixel values between the average pixel value of reference pixels and each pixel.

Figure 7A:
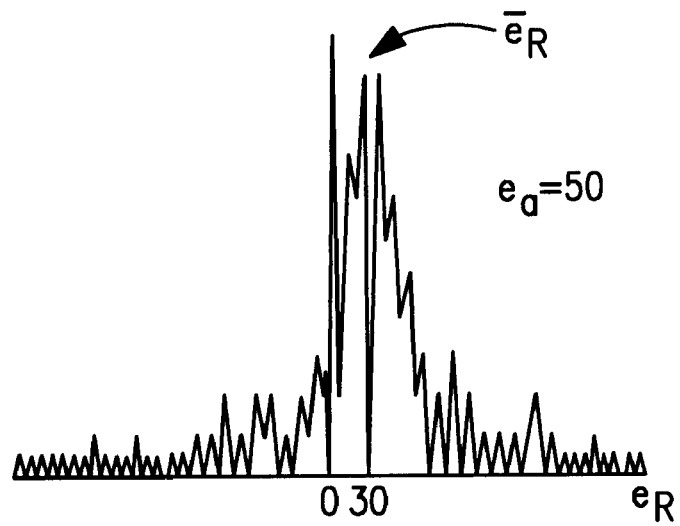
FIG. 7 (a) is an exemplary diagram of histogram of predictive error of each pixel of R plane at a position where the predictive error on G plane corresponds to 50 pixels.
Figure 7B:
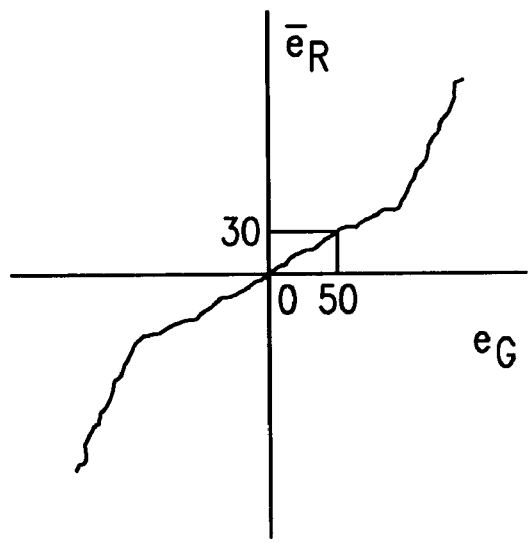

In the predictive error modifying means 405, the data of predictive error is modified by using the correlation of predictive error between planes. FIG. 7 (*a*) is a histogram of predictive errors of pixels of R plane corresponding to pixels of G plane whose predictive errors are 50, in a certain image. The axis of abscissas denotes the predictive error of R plane, and the axis of ordinates indicates the frequency of appearance. It is known from this diagram the predictive errors of the pixels of the R plane corresponding to pixels of G plane whose predictive errors are 50 are present mostly frequently around 30. It also shows that the average value of the predictive errors of the pixels of the R plane corresponding to pixels whose predictive errors are 50 is 30.

In a similar method, the predictive error of G plane and average values of predictive error of R plane are determined, and the former is plotted on the axis of abscissas and the latter on the axis of ordinates in FIG. 7 (*b*). Between B plane and G plane, too, there is a correlative relation similar to the one shown in FIG. 7 (*b*).

Figure 10:
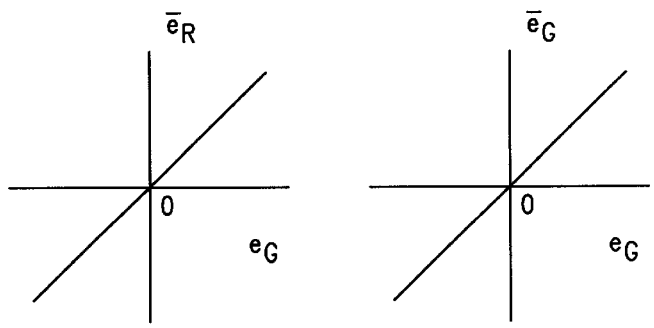
FIG. 10 is an exemplary diagram of predictive error modifying function.

Using the formula obtained from a correlation in FIG. 7 (*b*), or the table obtained from this diagram, modified values of predictive errors of pixels of R or B plane can be calculated, and the predictive errors can be modified by using the predictive values. When FIG. 7 (*b*) is approximated by a straight line, the diagram as shown in FIG. 10 is obtained.

The predictive error is obtained by subtracting the predictive value from the true pixel value, and the modified value of the predictive error is determined using a modification function of predictive error or the aforesaid table. An example of such modification function is the relational formula obtained from FIG. 7 (b).

Following is explained the above as an example of R plane, using G plane as reference plane.

The pixel value of the pixel of R plane is R, and its predictive value is Rp, and the predictive error $e_R$ of the pixel of R plane is expressed in formula 3.

$$e_R = R - R_p \quad \text{(Formula 3)}$$

Supposing the modified predicted error of R plane to be $e_{Rmod}$, and the modification function on the basis of the G plane represented by FIG. 7 (b) to be $f_R(e_G)$, the modified predictive error $e_{Rmod}$ of R plane is expressed in formula 4.

$$e_{Rmod} = e_R + f_R(e_G) \quad \text{(Formula 4)}$$

As the modification function, herein, using plural images, a statistical correlation may be determined between the predictive error of G plane and predictive error of R plane, and between the predictive error of G plane and predictive error of B plane, and a look-up table may be compiled by using this correlation, so that it may be considered to modify the predictive errors of R plane and B plane by referring to the look-up table when coding.

Alternatively, modifying data in two stages, in the first stage, the correlative relation between predicted error of R plane and predicted error of G plane, and the correlative relation between predicted error of B plane and predicted error of G plane are determined, and a table is compiled by optimizing the modification value of the predictive error of R plane and B plane on the basis of the predictive error of G plane, and in the second stage, using the compiled table, the predictive error of the R plane and B plane may be modified on the basis of the predictive error of G plane.

In this case, coding is completed by attaching the table used in modification to the coded data.

Further, the table may be used either commonly or exclusively in the R plane and B plane.

Or, by referring to the correlative relation between the predictive errors of the peripheral pixels of the coded G plane and the pixels of R plane or B plane corresponding to the peripheral pixels of the G plane, it may be considered to determine the modification value of the predictive error of the pixel to be coded on the R plane or B plane.

Figure 8:
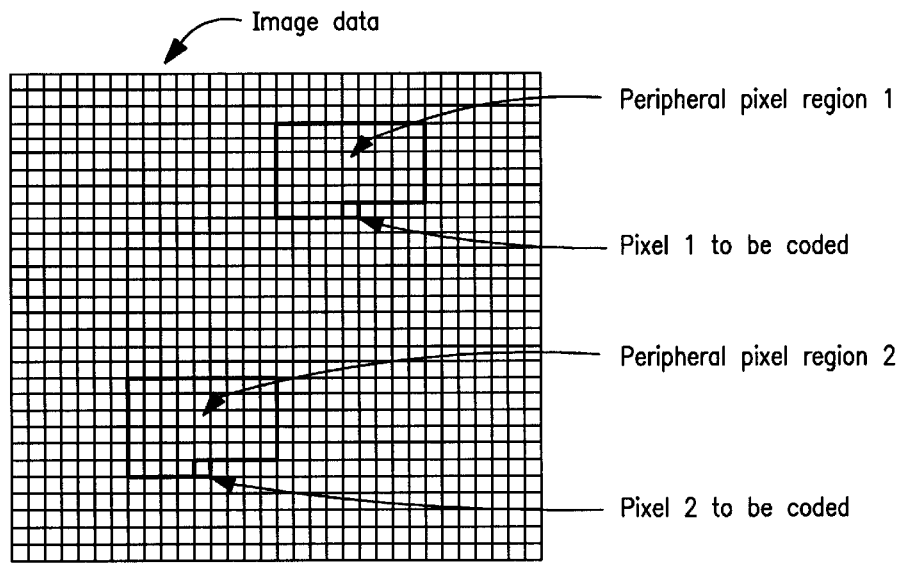
FIG. 8 is an explanatory diagram of data modification of predictive error using peripheral pixel information.
Figure 9:
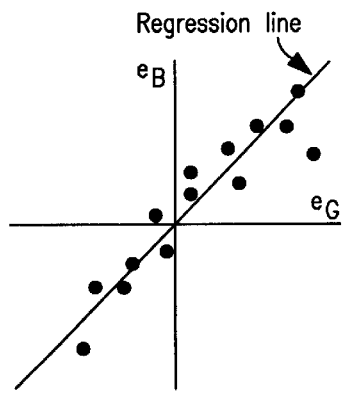
FIG. 9 is an exemplary diagram of correlative relation of predictive error of G plane and B plane.

Referring to FIG. 8, modification of predictive error by using the peripheral pixel information is explained below. To modify the predictive error of pixel 1 to be coded of R plane or B plane by using predictive error by predictive coding within plane of G plane, the modification value is determined by referring to the relation of the predictive error of R plane or B plane on the basis of the predictive errors of the pixels in the peripheral pixel region 1 of G plane. The correlative relation is determined, as shown in FIG. 9, as regression line by graphically expressing the relation of the predictive error of R plane or B plane to the predictive error of each pixel in the peripheral pixel region 1 of G plane. The predictive error of the pixel 1 to be coded of G plane is applied to this regression line, and the coordinates of the predictive error of the pixel 1 to be coded of R plane or B plane are read. Then, subtracting the read value from the predictive error of R plane or B plane, the obtained value is determined as the modified predictive error. As for the pixel 2 to be coded, too, the modified predictive value is determined in the same manner. Repeating this operation, the modified predictive errors of all pixels in the image are determined.

In this case, the peripheral pixel region may be variable depending on the image.

Figure 21:
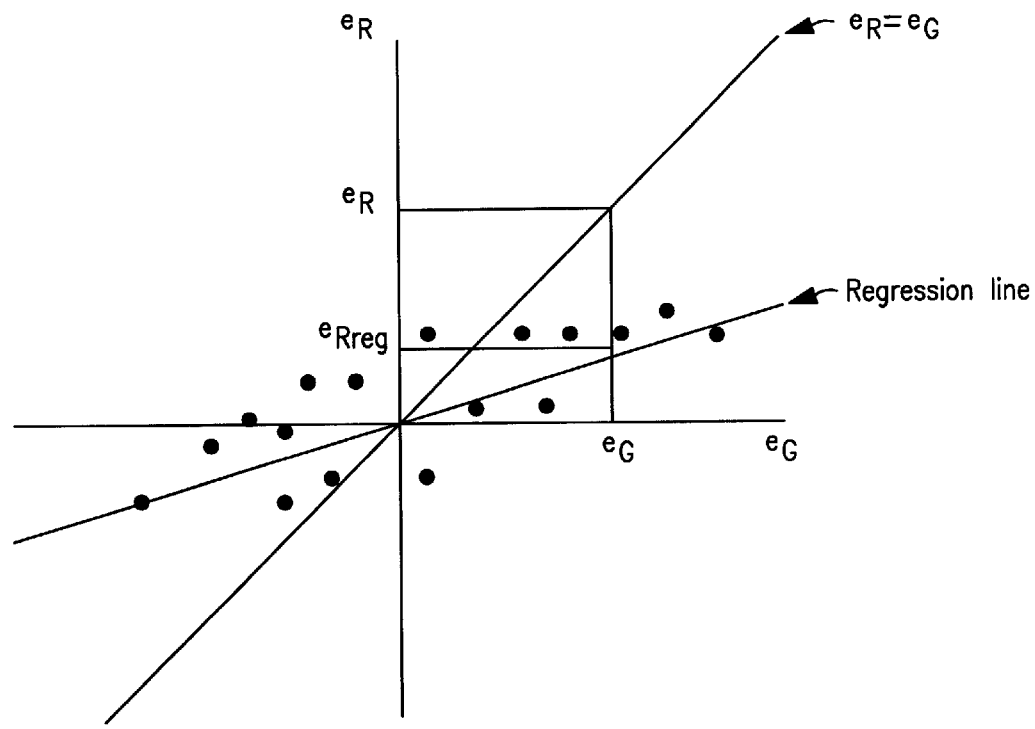
FIG. 21 is an explanatory diagram of a method of determining the modified value of predictive error in embodiment 1 of the invention.
Figure 22:
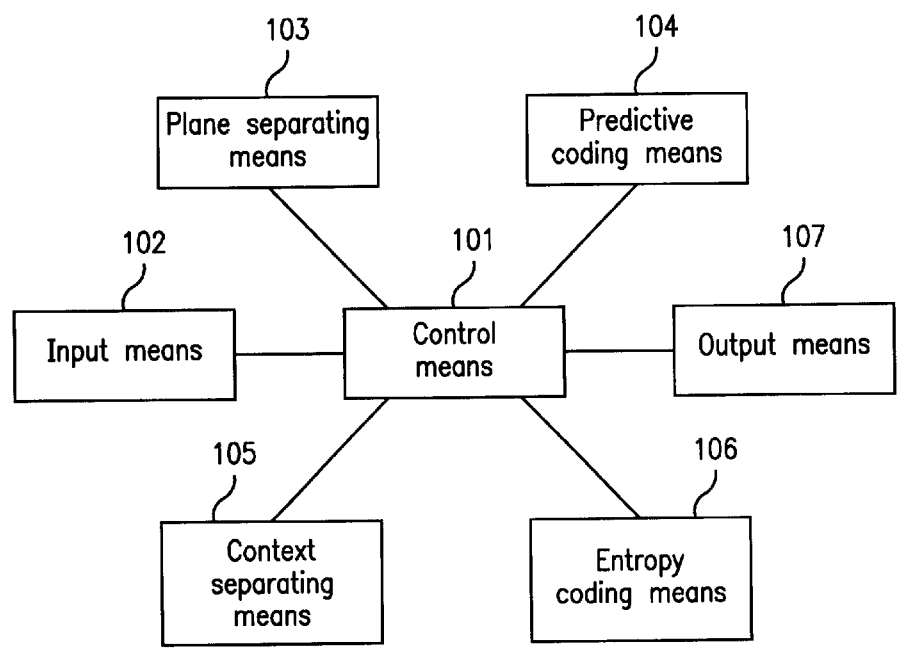
FIG. 22 is a structural diagram of a general reversible coding apparatus of RGB data in prior art.
Figure 23:
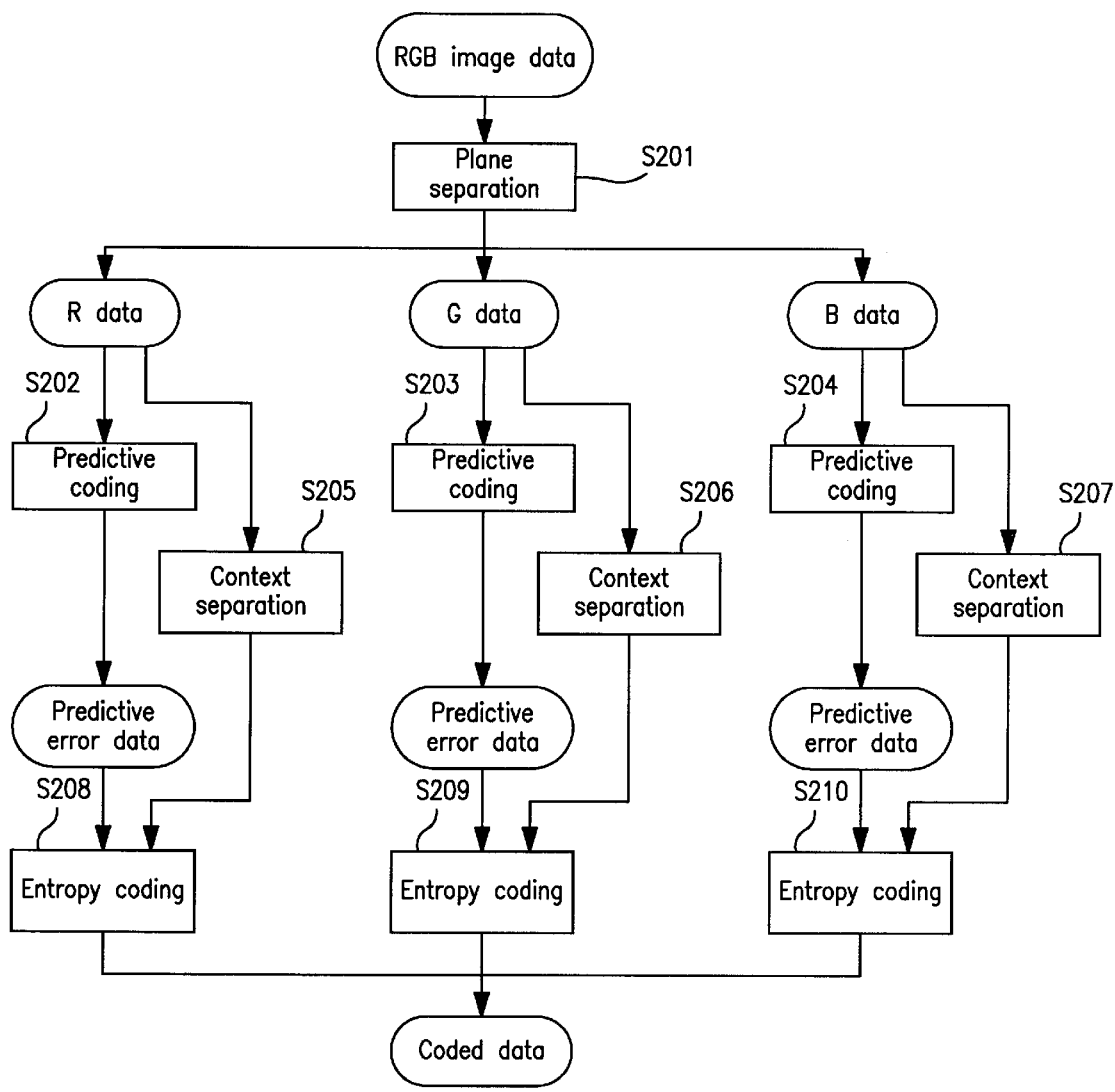
FIG. 23 is a flowchart of a general reversible coding method of RGB data in prior art.
Figure 24:
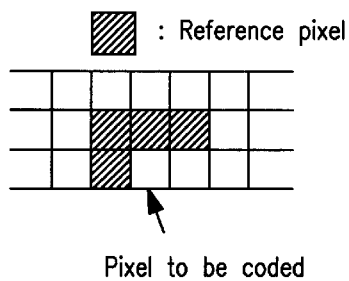
FIG. 24 is an exemplary diagram of reference pixels to be used in context separation in prior art.

The modified value of the predictive error may be either determined only by the relation of the predictive error of R plane and B plane to the predictive error in the peripheral pixel region of G plane as mentioned above, or determined, after once determining the basic modification formula, by correcting the modification formula depending on the relation of the predictive error of R plane and B plane to the predictive error in the peripheral pixel region of G plane. The latter case is further described by referring to FIG. 21. Supposing the basic modified value to be $e_G$, same as in FIG. 9, the regression line is determined from the relation between the predictive errors of the pixels in the peripheral pixel region of G plane and the predictive errors of the pixels of R plane or B plane corresponding to the pixels of the G plane. From the aforesaid graph, the value of $e_R$ on the regression line corresponding to $e_G$ is read, and the read value is defined as $e_{Rreg}$, and the corrected modified value $e_{Rmod}$ is calculated according to formula 5, where m is the weighting coefficient.

$$e_{Rmod} = e_R + m^x(e_{Rreg} - e_R) \quad \text{(Formula 5)}$$

Investigating many images statistically, it is known that the relation between the predictive error of G plane and predictive error of R plane, or the relation between the predictive error of G plane and predictive error value of B plane is nearly the same value as shown in FIG. 10. Therefore, the modification functions $f_R(e_G)$ and $f_B(e_G)$ of predictive errors of R plane and B plane to the predictive error of G plane are both defined same as $-e_G$, and the predictive error may be modified.

The entropy coding means 406 codes by entropy coding the predictive error of each plane, and issues coded data. The input of the entropy coding means 406 may contain the predictive error and modified predictive error. In this case, in RGB data, when the predictive error of R plane and predictive error of B plane are modified by the predictive error of G plane, the predictive error entered in the entropy coding means 406 includes the predictive error eG of G plane and modified predictive errors $e_{Rmod}$ and $e_{Bmod}$ of R plane and B plane.

Possible methods of entropy coding include Huffman coding, arithmetic coding, Golomb coding, and MEL coding.

(2) Embodiment 2

Embodiment 2 of the invention is described below.

As compared with coding in embodiment 1 which is entropy coding of the predictive error or modified predictive error of each plane under one condition, coding in embodiment 2 is characterized by calculating the context of image to be coded by using the predictive error intensity calculated from the predictive error of the peripheral pixel of the pixel to be coded, by separating the predictive error into plural groups by using this context and entropy coding in a condition suited to each separated group.

Figure 11:
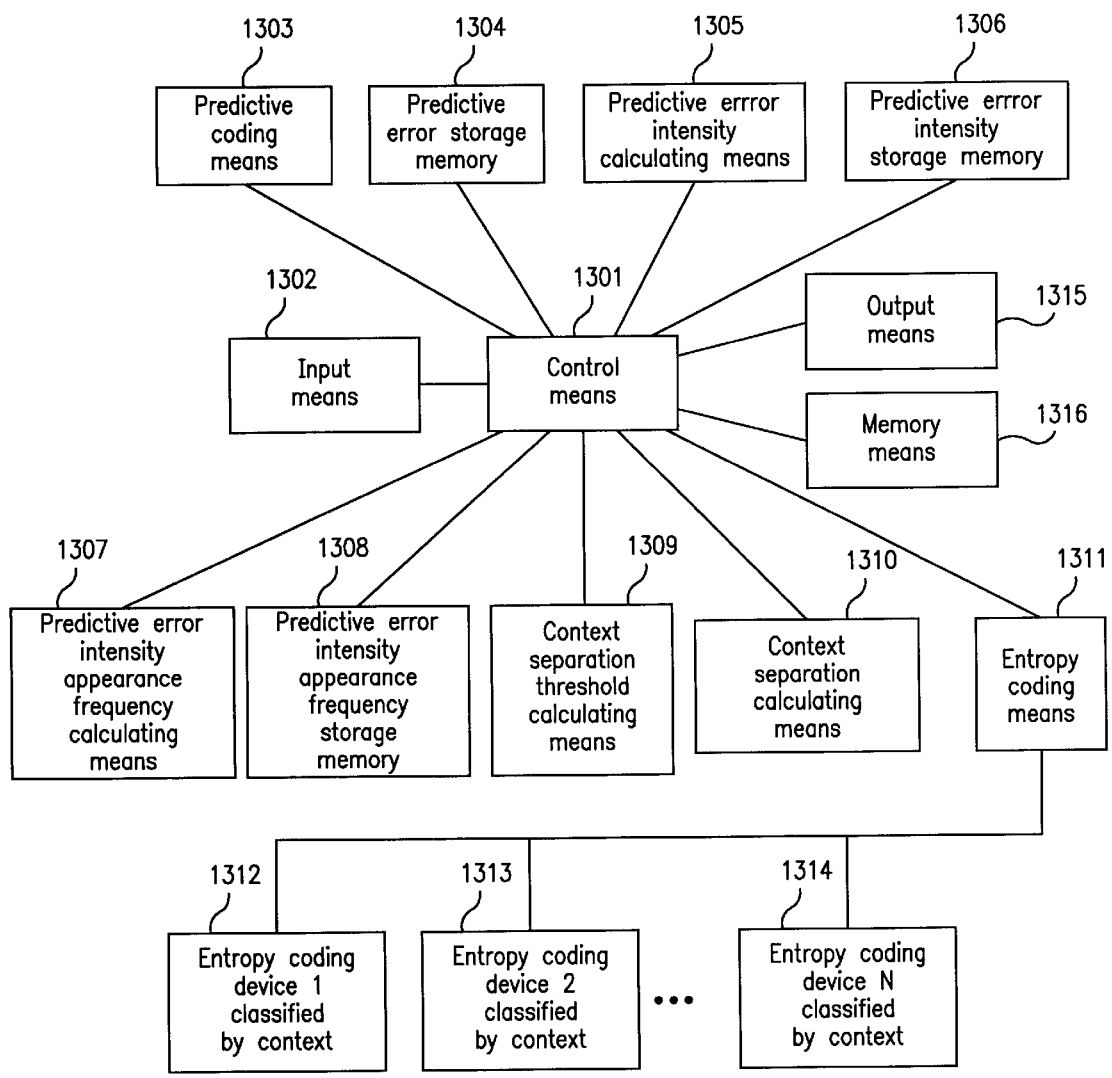
FIG. 11 is a structural diagram of a reversible coding apparatus in embodiment 2 of the invention.
Figure 12:
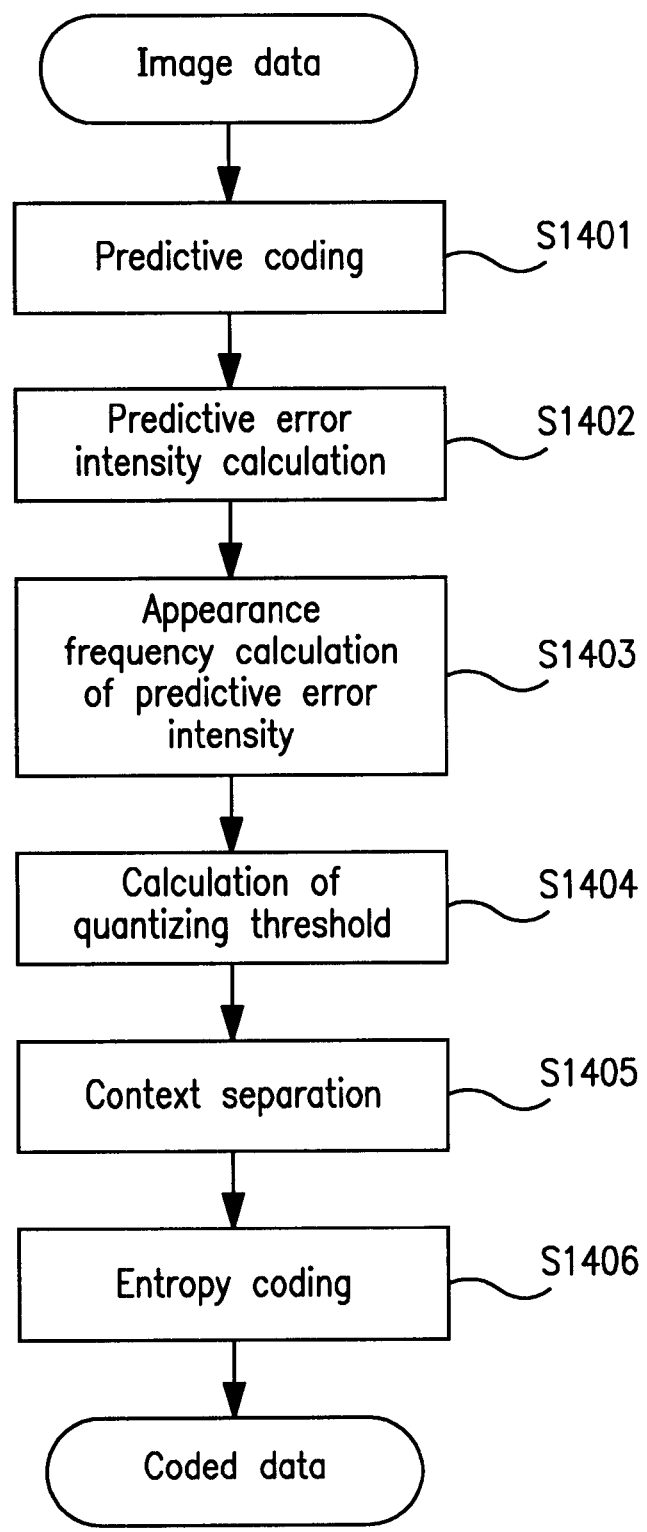
FIG. 12 is a flowchart of reversible coding method in embodiment 2 of the invention.

FIG. 11 shows a constitution of a reversible coding apparatus according to embodiment 2 of the invention, and FIG. 12 is a flowchart of a reversible coding method of embodiment 2 of the invention.

The operation of the reversible coding apparatus of color image data in embodiment 2 is described below while referring to FIG. 11 and FIG. 12.

Control means 1301 for controlling the processing of image data receives input image data from data input means 1302, and transfers the data to predictive coding means 1303. The predictive coding means 1303 determines the predictive value by using the peripheral pixel information, calculates the predictive error which is the difference between the predictive value and the actual pixel value, and stores predictive error in a predictive error storage memory 1304 (S1401).

Predictive error intensity calculating means 1305 receives an instruction from the control means 1301, refers to the predictive error storage memory 1304, calculates the sum of absolute values of the predictive errors of coded peripheral pixels of the pixels to be coded, and stores the sum as the predictive error intensity in a predictive error intensity storage memory 1306 (S1402).

Predictive error intensity appearance frequency calculating means 1307 receives an instruction from the control means 1301, refers to the predictive error intensity storage memory 1306, calculates the appearance frequency of each predictive error intensity in the entire image, and stores it in a predictive error intensity appearance frequency storage memory 1308 (S1403).

Context separation threshold calculating means 1309 receives an instruction from the control means 1301, refers to the predictive error intensity appearance frequency storage memory 1308, and determines the quantizing threshold for quantizing the predictive error intensity so that the appearance frequency may be uniform at each quantizing level (S1404).

Context separation calculating means 1310 receives an instruction from the control means 1301, calculates the context according to referring to the quantizing threshold determined by the context separation threshold calculating means 1309 and the predictive error intensity storage memory 1306.(S1405).

Entropy coding means 1311 receives an instruction from the control means 1301, selects the entropy coding device, out of 1312 to 1314, most suited to each group separated by the context calculated by the context separation calculating means 1310, and codes by entropy coding the predictive error stored in the predictive error storage memory 1304 (S1406).

Finally, the control means 1301 makes output means 1315 to issue the coded data.

The control means 1301 may also comprise memory means 1316 storing a control program for controlling these operations, so that the operation of each means may be controlled by the control program stored in the memory means 1316.

In the example of processing explained so far, the entire image is handled as the unit, but the image may be preliminarily divided into plural regions, and each region may be handled as a unit to execute the same processing. In such a case, coding matched according to the partial feature of the image can be effected, and the coding efficiency can be enhanced.

The operation of each means is specifically described below.

Figure 13:
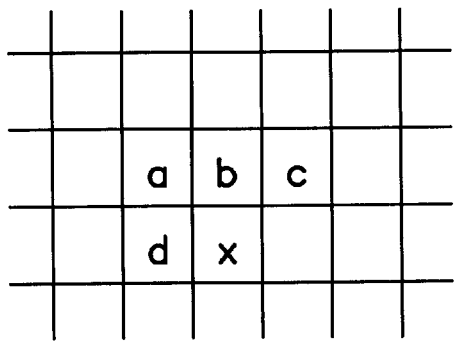
FIG. 13 is an explanatory diagram of predictive coding.

The predictive coding means 1303 processes predictive coding of the input color image. FIG. 13 is an explanatory diagram of predictive coding. The predictive coding means 1303, using pixel values a,b,c and d of coded peripheral pixels a,b,c and d of the pixel x to be coded, calculates a predictive value $x_p$ of the pixel x to be coded, and issues the difference of the predictive value $x_p$ and the actual pixel value x as the predictive error e. Herein, the pixel and its pixel value are expressed by the same symbol. This predictive value may be calculated in four methods as shown in formula 6.

| (Formula 6) | |
| --- | --- |
| Previous-sample predictive value | $x_p = d$ |
| Matrix predictive value | $x_p = (b + d)/2$ |
| Plane predictive value | $x_p = b + d - a$ |
| Average predictive value | $x_p = (b + d)/2$ |

Herein, the sequence of the pixel for predictive coding may include the raster sequence, the data sequence by creating sub-sampling data, and other methods.

As the prediction formula, one formula may be fixed out of the formula 6, plural formulas may be used to make trial calculations, and the most efficient formula may be selected, or the prediction formula may be changed over depending on the context of the peripheral pixel.

In this example, the number of peripheral pixels for calculating the predictive value is four pixels, but it is not limited to this number.

Figure 14:
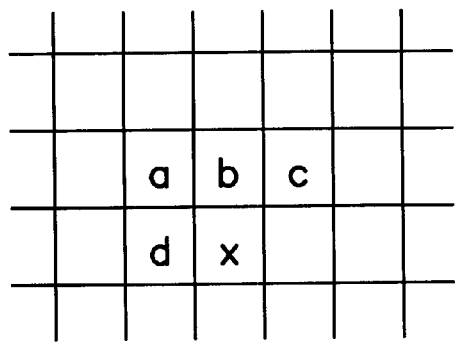
FIG. 14 is an explanatory diagram of predictive error intensity calculation.

Next, the predictive error intensity calculating means 1305 calculates the predictive error intensity D. FIG. 14 is an explanatory diagram of calculation of predictive error intensity D by using the predictive error of four peripheral pixels. The predictive error intensity calculating means 1305 calculates the sum of absolute values of predictive error values $e_a$, $e_b$, $e_c$, $e_d$ of coded peripheral pixels a, b, c, d of the pixel x to be coded, and issues it as the predictive error intensity D.

Herein, the number of coded peripheral pixels to be referred to is not limited to four pixels. The greater the number of pixels to be referred to, the higher is the precision for calculating the predictive error intensity D, but the quantity of computation and required capacity of memory increase as the number of reference pixels increases, so that a practical number of reference pixels must be determined properly.

Figure 15:
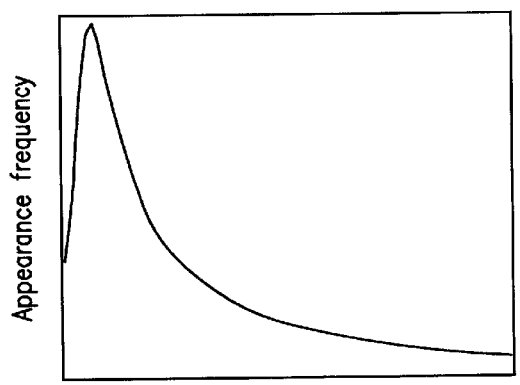
FIG. 15 is an exemplary diagram of histogram expressing the frequency of appearance in terms of predictive error intensity.

The predictive error intensity appearance frequency calculating means 1307 calculates the appearance frequency of the predictive error intensity D, and sends it out to the predictive error intensity appearance frequency storage memory 1308. FIG. 15 is a histogram of calculation of appearance frequency of predictive error intensity D in the entire image. In the case of the pixel value of 256 gradations, the dynamic range of the predictive error is −255 to 255, and the dynamic range of the predictive error intensity D of four peripheral pixels is 0 to 1020. In all pixels, this predictive error intensity D is calculated, and the degree of appearance frequency of each value is calculated. Herein, if the appearance frequency is calculated in every value of all predictive error intensities, the quantity of computation and required capacity of memory are tremendous, and therefore the predictive error intensity D may be quantized, and the appearance frequency may be calculated in very level of quantization.

Figure 16:
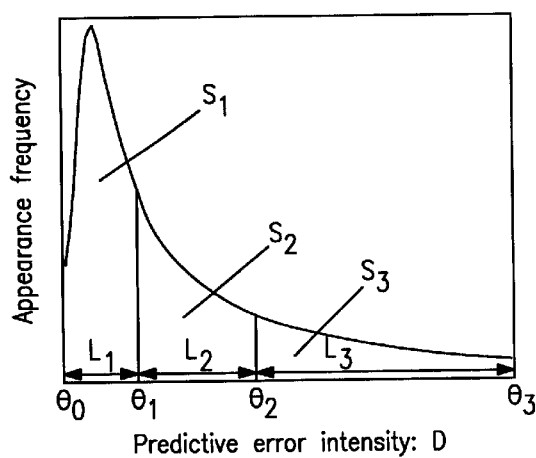
FIG. 16 is an explanatory diagram of nonlinear quantization of the predictive error intensity shown in FIG. 15.

The context separation threshold calculating means 1309 refers to the predictive error intensity appearance frequency storage memory 1308, and calculates the quantization threshold for this quantization. FIG. 16 is an explanatory diagram for explaining the method of determination of the quantization threshold for nonlinear quantization. In the case of quantizing of the region of the predictive error intensity in the diagram nonlinearly into three levels, $L_1$, $L_2$ and $L_3$, the quantization thresholds $\theta_0$, $\theta_1$, $\theta_2$, $\theta_3$ may be determined so that the cumulative appearance frequencies $S_1$, $S_2$, $S_3$ may be equal at each level of quantization.

Alternatively, in the case of linear quantization, it may be also considered to determine the quantization thresholds $\theta_0$, $\theta_1$, $\theta_2$, $\theta_3$ so that the quantization levels $L_1$, $L_2$, $L_3$ may be equal regardless of the frequency of appearance.

The number of quantization levels in this case may be determined by a method of increasing the number of quantization levels gradually, and determining the number of quantization levels when the decrement of the entropy before and after increase of quantization levels becomes smaller than a predetermined value, aside from a method of setting at a predetermined value.

Figure 17:
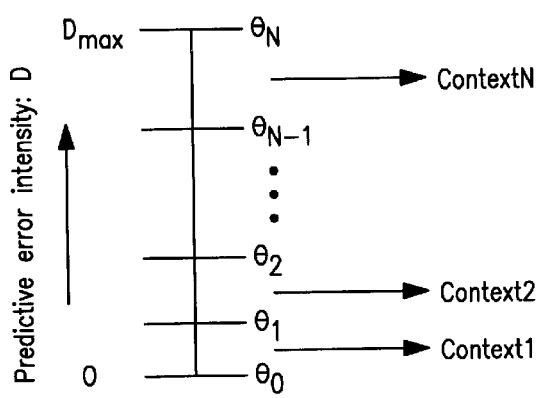
FIG. 17 is an explanatory diagram of calculation of context from the predictive error intensity.

The context separation calculating means 1310 calculates the context, by using the number N of the determined quantization levels and the quantization thresholds $\theta_0$ to $\theta_N$ from the predictive error intensity D stored in the predictive error intensity storage memory 1306. FIG. 17 is an explanatory diagram of context calculation. Supposing the maximum value of the predictive error intensity D to be $D_{max}$, the predictive error intensity D ($0 \leq D \leq D_{max}$) is compared with thresholds $\theta_0$ to $\theta_N$ and the context is determined so that the context of the pixel having the predictive error intensity may be r when the predictive error intensity D satisfies formula 7.

$$\theta_{r-1} \leq D \leq \theta_r \quad \text{(Formula 7)}$$

The entropy coding means 1311 goes on coding of the predictive errors stored in the predictive error storage memory 1304 by using the entropy coding devices 1312 to 1314 optimized to each context.

Possible methods of entropy coding include Huffman.coding, arithmetic coding, Golomb coding, and MEL coding respectively.

The coding devices 1312 to 1314 may be also considered to code by optimizing for the each image data to be coded, or to code by optimizing for the learning data preliminarily extracted from plural pieces of image data.

So far, the image data is explained as one plane for the sake of convenience, but the same processing may be applied on the data having plural planes predictive coding within plane or between planes as shown in embodiment 1.

(3) Embodiment 3

Embodiment 3 of the invention is described below.

The input in embodiment 2 is not separated into planes, but the input in embodiment 3 is separated into planes, and it is a further feature that the predictive errors of these planes are a mixture of modified predictive errors and non-modified predictive errors.

Figure 18:
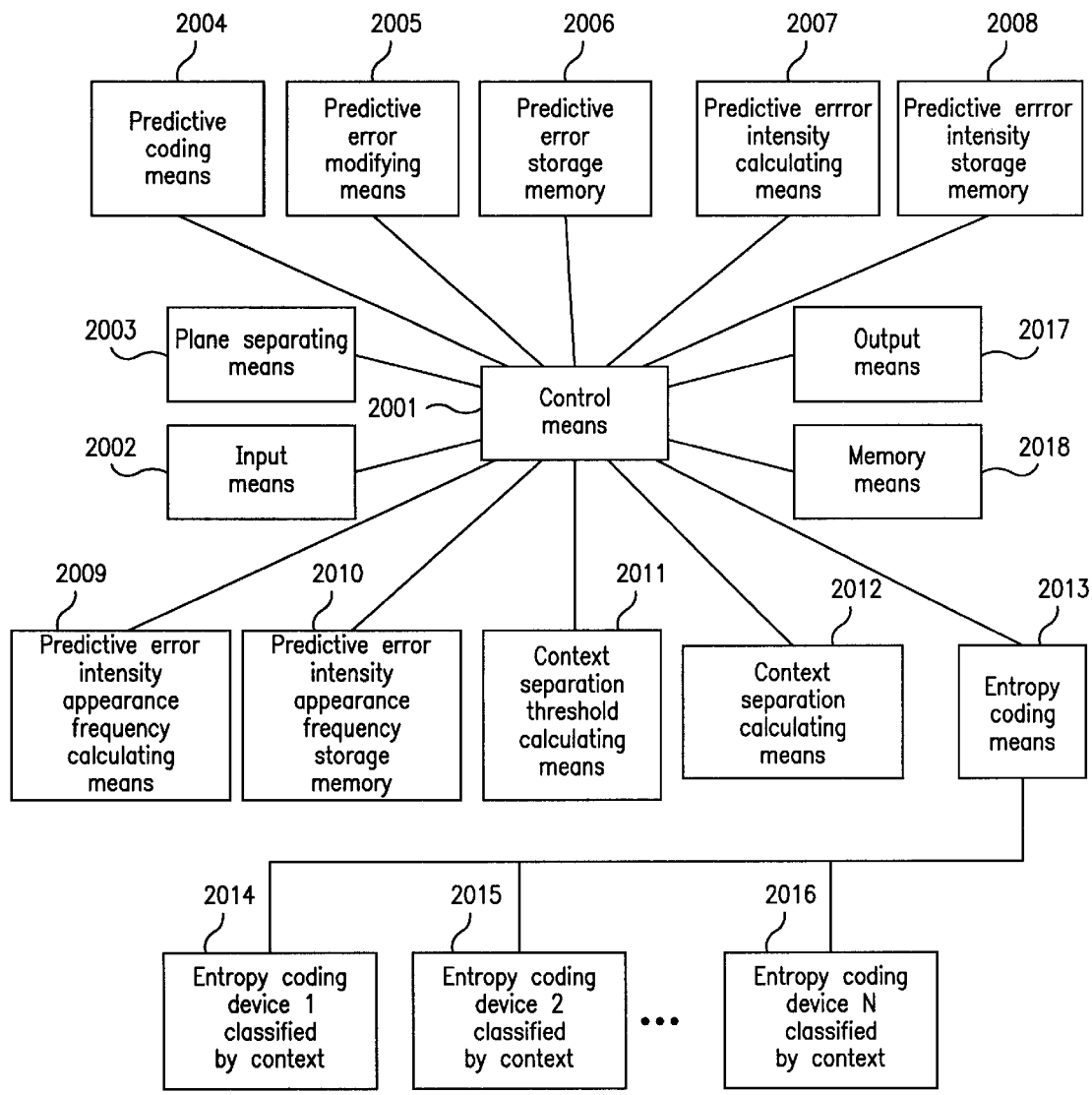
FIG. 18 is a structural diagram of a reversible coding apparatus in embodiment 3 of the invention.
Figure 19:
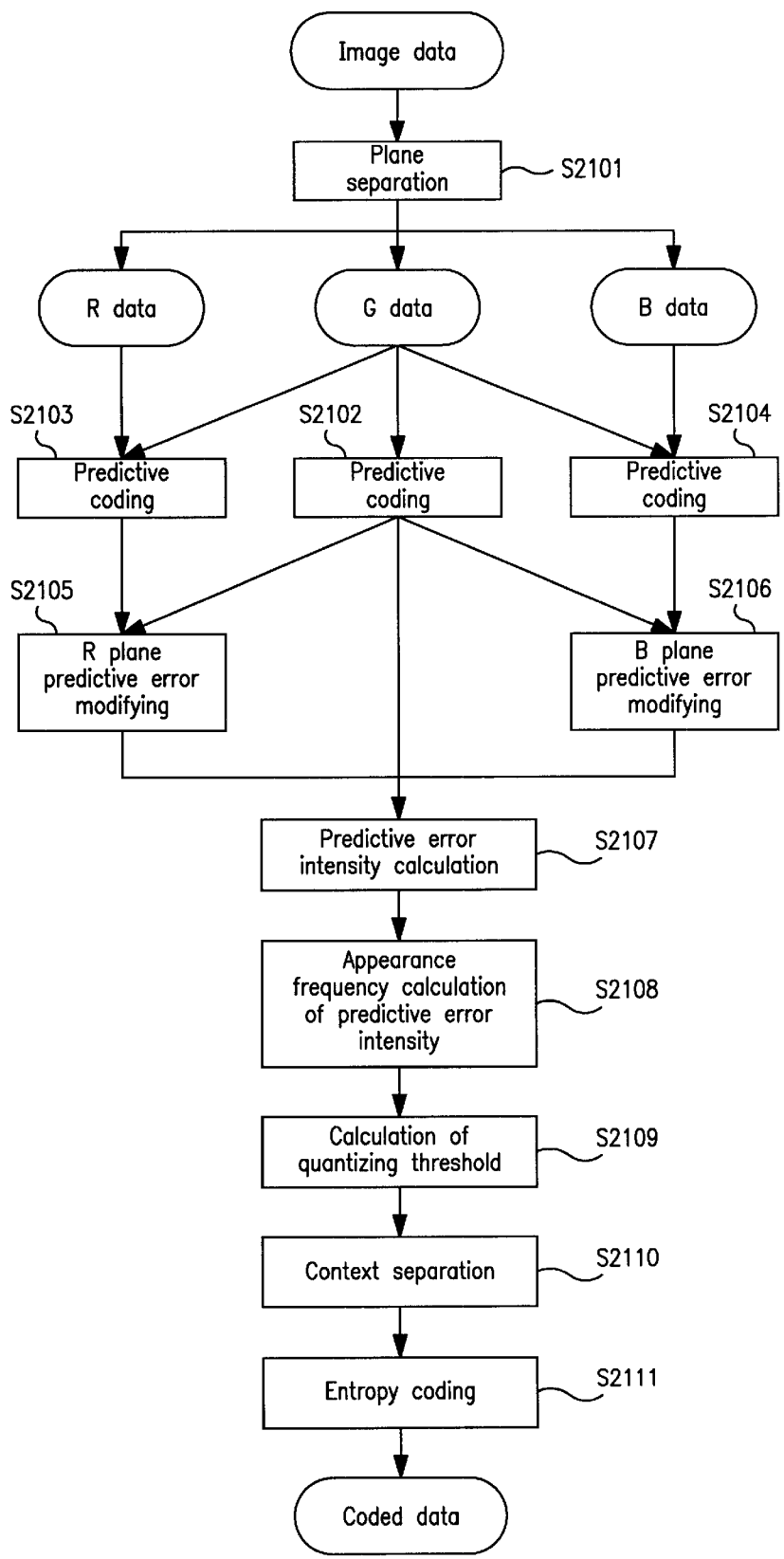
FIG. 19 is a flowchart of reversible coding method in embodiment 3 of the invention.

FIG. 18 is a structural diagram of a reversible coding apparatus according to embodiment 3 of the invention, and FIG. 19 is a flowchart of a reversible coding method of embodiment 3 of the invention. In thus constituted reversible coding apparatus of color image data of embodiment 3 of the invention, the operation is described below while referring to FIG. 18 and FIG. 19.

In this explanation, the input image is supposed to be RGB data. Input image data is fed into input means 2002. Control means 2001 receives the data from the data input means 2002, and transfers the data to plane separating means 2003. Herein, the plane separating means 2003 modifies the input image data into data of R, G and B planes, and transfers them to the control means 2001 (S2101).

The control means 2001 transfers the data of G plane to predictive coding means 2004, and the predictive coding means 2004 processes predictive coding of the G plane by using the peripheral pixel information within plane of G plane, and stored the predictive error data in a predictive error storage memory 2006 (S2102).

The pixel data of R plane and pixel data of G plane are transferred to the predictive coding means 2004, and the predictive coding means 2004 processes predictive coding of the R plane by using the peripheral pixel information of the pixel to be coded out of the pixel data of R plane and pixel data of G plane, and stores the predictive error data into the predictive error storage memory 2006 (S2103).

Herein, in some case, the data of G plane may not be used in prediction same as in the case of embodiment 1. Further, same as in embodiment 1, the prediction formula for predicting within plane of R plane may be selected by referring to the corresponding pixel of the G plane.

Moreover, the predictive coding means 2004 processes predictive coding of the B plane in the same manner as in R plane, and stores the predictive error data into the predictive error storage memory 2006 (S2104).

Herein, in some case, same as in the case of predictive coding of R plane, the pixel data of G plane may not be used in prediction. Also, herein, referring to the corresponding pixel of the G plane, the prediction formula of the predictive coding within plane of B plane may be selected.

Next, the control means 2001 transfers the predictive error data of R plane and predictive error data of G plane from the predictive error storage memory 2006 to the predictive error modifying means 2005, and the predictive error modifying means 2005 modifies the predictive error data of the R plane by using the predictive error data of G plane, and stores the modified predictive error data of R plane into the predictive error storage memory (S2105).

In succession, the control means 2001 processes the B plane same as at step S2105 for the R plane, and stores the modified predictive error data of B plane into the predictive error storage memory 2006 (S2106)

The predictive error intensity calculating means 2007 receives an instruction from the control means 2001, refers to the predictive error storage memory 2006, calculates the predictive error intensity expressing the sum of absolute values of predictive errors of coded peripheral pixels of the pixel to be coded, and stores in the predictive error intensity storage memory 2008 (S2107).

The predictive error intensity appearance frequency calculating means 2009 refers to the predictive error intensity storage memory 2008, calculates the appearance frequency of each predictive error intensity, and stores in the predictive error intensity appearance frequency storage memory 2010 (S2108).

The context separation threshold calculating means 2011 receives an instruction from the control means 2001, refers to the predictive error intensity appearance frequency storage memory 2010, and determines the quantization threshold so that the appearance frequency of predictive error intensity may be uniform at each quantization level (S2109).

The context separation calculating means 2012 receives an instruction from the control means 2001, and calculates the context by referring to the quantization threshold determined by the context separation threshold calculating means 2011 and the predictive error intensity storage memory 2008 (S2110).

The entropy coding means 2013 receives an instruction from the control means 2001, selects the entropy coding device, out of 2014 to 2016, most matched with the context calculated by the context separation calculating means 2012, and codes by entropy coding the predictive error stored in the predictive error storage memory 2006 (S2111).

Finally, the control means 2001 makes the output means 2017 to issue the coded data.

Figure 20:
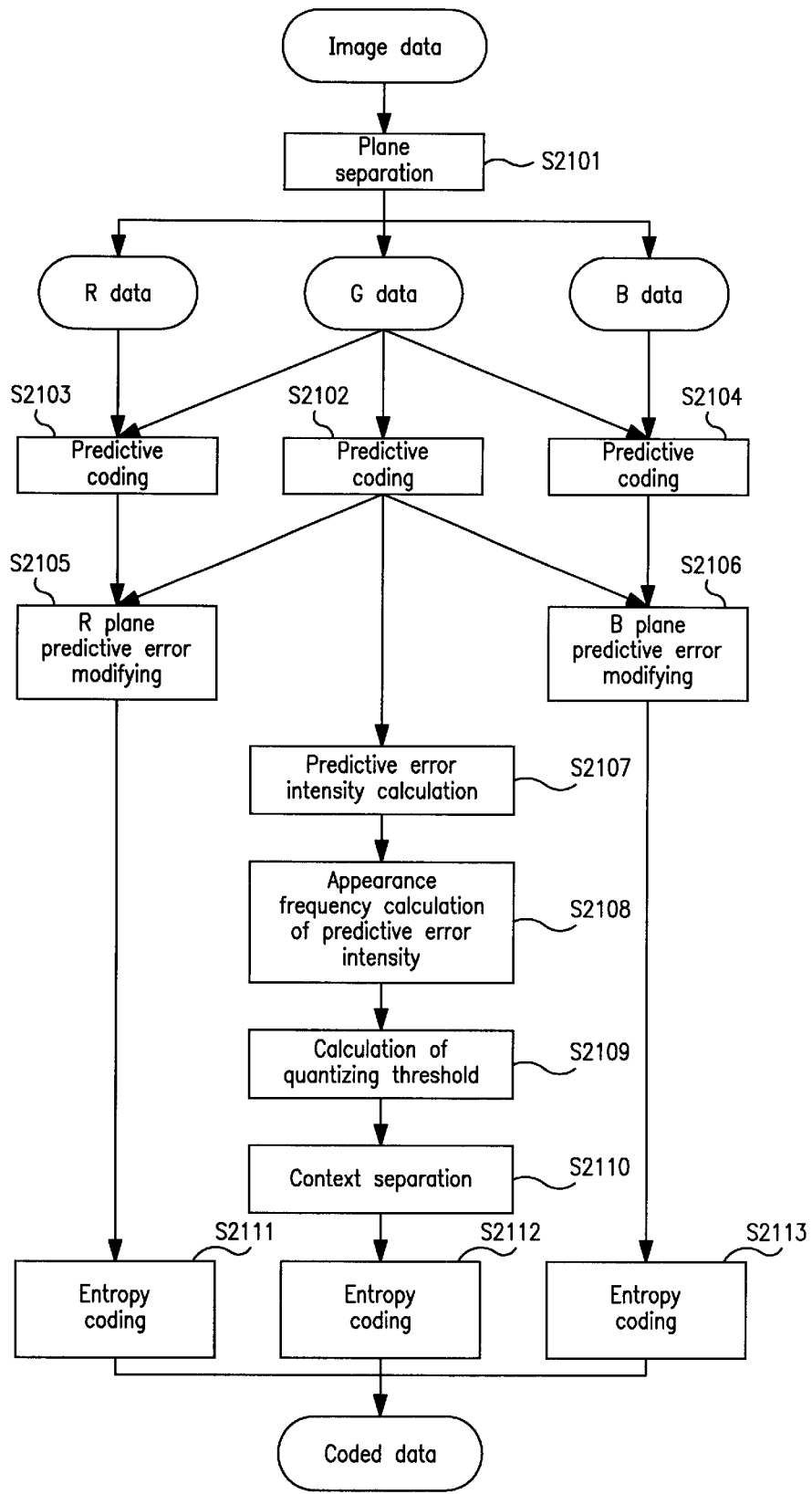
FIG. 20 is a flowchart of reversible coding method in embodiment 3 of the invention.

Moreover, as shown in the flowchart in FIG. 20, only the predictive error data of G plane is separated into plural groups by the context and coded by entropy coding, and as for R plane and B plane, it may be considered to code the modified predictive error data by entropy coding.

Commonly in embodiments 1, 2 and 3, the following effects are obtained. That is:

In the foregoing predictive coding, the entire image is not handled as a unit, but is preliminarily divided into plural regions, and the coding of the invention may be applied in the each region.

When determining the predictive value or determining the modified value of predictive error, without having to calculate in all pixels, one pixel can be selected in a predetermined region, and the formula as a function of that pixel is determined, and it may be applied in all pixels in the region.

Thus, according to the invention, by predictive coding of color image data, the predictive error data can be modified by using the correlation of planes, being followed by entropy coding, so that a reversible coding method of high rate of compression is realized.

In the case the input image is RGB data, the predictive error can be modified efficiently by modifying the predictive errors of R plane and B plane using the predictive error of the G plane having a strong correlation of predictive errors.

Also in the case the input image is RGB data, by modifying the predictive error by referring to the look-up table of data modification, it is not necessary to change over the modification values for various images, and the number of operations can be decreased, so that the modified predictive error can be obtained at high speed.

Further in the case the input image is RGB data, by dividing the data modification step into two stages, a table can be compiled by optimizing the modified values of predictive errors of R plane and B plane, and the predictive errors can be modified by using the table optimized to the image to be coded, thereby enhancing the rate of compression.

Moreover, by modifying the predictive errors of R plane and B plane by using the modified value determined by referring to the correlative relation of the coded peripheral pixel of G plane and the predictive error of B plane or R plane, the predictive error can be modified at high precision by using the local information of image.

On the other hand, the predictive coding is done not only on the coded peripheral pixel information of the plane having the pixel to be coded, but also on the peripheral pixel information of the coded plane corresponding to the pixel to be coded, and it is possible to use the pixel information of different color planes in this predictive coding and the whole peripheral pixel information of the pixel to be coded, therefore this coding can use the predictive value of high precision and can be obtained high efficiency coding.

In the case of predictive coding of changing over the prediction formulas depending on the state of the context of the peripheral pixels, if there is a coded plane, the context is determined by using the whole peripheral pixels of the coded plane corresponding to the pixel to be coded simultaneously with the coded peripheral pixels of the same plane as the pixel to be coded, and therefore the more suited prediction formula for the peripheral pixel information can be used and the precision of prediction may be enhanced.

In the case the input image is RGB data, when predicting R plane and B plane, the prediction formula can be selected by the context determined by using also the peripheral pixel information of G plane having a strong correlation to each plane, so that the precision of prediction may be enhanced.

Further, when separating the predictive error into groups by the context, and executing entropy coding suited to each separated group, because of determining the context by using the predictive error of the coded peripheral pixels of the pixel to be coded, a practical context separation of high precision is possible, and the, reversible coding method of high coding efficiency is realized.

When separating the context, by determining the context by linearly quantizing the predictive error intensity, the reversible coding method by context separation is realized by a very simple calculation and at a very high speed.

Still more, when separating the context, by determining the context by nonlinearly quantizing the predictive error intensity so that the appearance frequency may be uniform at each quantization level, efficient entropy coding may be realized by few context patterns, and the quantity of computation and required capacity of memory become small, so that a reversible coding method by efficient context separation may be realized.

By executing the context separation by dividing into two steps, that is, a step of calculating the appearance frequency of the predictive error intensity of the entire image data and determining the quantization threshold so that the appearance of predictive error intensity may be uniform, and a step of determining the context by using the quantization threshold, entropy coding suited to the image data to be coded is possible, and a reversible coding method of high coding efficiency is realized.

Furthermore, when executing the context separation, by increasing gradually the number of levels of quantization when dividing the predictive error intensity into groups, it is executed by dividing into two steps, that is, a step of determining the quantization threshold by the number of quantization levels when the decrement of the entropy due to increase in the number of quantization levels becomes smaller than the predetermined threshold, and a step of determining the context by using the quantization threshold, entropy coding is possible by the number of context patterns suited to the image to be coded, so that a practical and efficient reversible coding method may be realized.

What is claimed is:

1. A reversible coding method comprising:
   a predictive coding step of separating color image input data into plural planes and processing predictive coding said data within plane or between planes in every plane,
   a modifying step of modifying the predictive error data by said predictive coding by using a correlation of predictive errors between planes, and
   an entropy coding step of coding by entropy coding of the modified predictive error data and non-modified predictive error data,
   wherein the input image data is RGB data, in said predictive coding step, the pixels of specific color plane are processed predictive coding within plane and the pixels of other color planes except for the specific color plane are processed predictive coding between planes or within plane by using the pixel values of specific color plane as reference values, and in said modifying step, the predictive errors of other color planes are modified by using the predictive errors of a specific color plane as reference values, the specific color plane is G plane, and other color planes are R and B planes, and the modified predictive error of each pixel of R or B plane obtained by adding the value obtained as a function of predictive error of the corresponding pixel of G plane to the predictive error of the pixel to be coded in R or B plane is coded by entropy.

2. A reversible coding method of claim 1, wherein the modification function is a negative predictive error of the pixel to be coded of G plane.

3. A reversible coding method of claim 1, wherein said modifying step is divided into two stages, that is, at the first stage, the relation of predictive errors between G plane and R plane and between G plane and B plane of all image data is statistically summed up, the modified values of predictive errors of R plane and B plane on the basis of the predictive error of G plane are optimized, and the look-up table is compiled using said modified values, and at the second stage, using this table, the predictive errors of R plane and B plane are modified on the basis of the predictive error of G plane, and the table is attached to the coded data, and coded data is created.

4. A reversible coding method of claim 1, wherein in the modifying step for modifying the predictive error data by utilizing the correlation of predictive errors between planes, the modified value of the predictive error of the pixel to be processed predictive coding of R plane or B plane on the basis of the predictive error of the pixel of G plane corresponding to the pixel to be coded of R plane or B plane is determined by referring to the correlative relation obtained from the coded peripheral pixels of the pixel to be coded of R plane or B plane, the pixel of G plane corresponding to the pixel to be coded, and the predictive error of its peripheral pixels, and the predictive error of R plane or B plane on the basis of the predictive error of G plane is modified by using this modified value.

5. A reversible coding method of claim 4 comprising:
a predictive coding step of separating color image data into plural planes and processing predictive coding said data within plane or between planes in every plane,
a modifying step of modifying the predictive error data by said predictive coding by using a correlation of predictive errors between planes, and
an entropy coding step of coding by entropy coding of the modified predictive error data and non-modified predictive error data,
wherein the input image data is RGB data, in said predictive coding step, the pixels of specific color plane are processed predictive coding within plane and the pixels of other color planes except for the specific color plane are processed predictive coding between planes or within plane by using the pixel values of specific color plane as reference values, and in said modifying step, the predictive errors of other color planes are modified by using the predictive errors of specific color plane as reference values,
wherein the specific color plane at said modifying step is G plane, and other color planes are R and B planes, and said modifying step is divided into two stages, that is, at the first stage, the relation of predictive errors between G plane and R plane and between G plane and B plane of all image data is statistically summed up, the modified values of predictive errors of R plane and B plane on the basis of the predictive error of G plane are optimized, and the look-up table is compiled using said modified values, and at the second stage, using this table, the predictive- errors of R plane and B plane are modified on the basis of the predictive error of G plane, and the table is attached to the coded data, and coded data is created.

6. A reversible coding method comprising:
a predictive coding step of separating color input image data into plural planes and processing predictive coding said data within plane or between planes in every plane,
a modifying step of modifying the predictive error data by said predictive coding by using a correlation of predictive errors between planes, and
an entropy coding step of coding by entropy coding of the modified predictive error data and non-modified predictive error data,
wherein the input image data is RGB data, in said predictive coding step, the pixels of specific color plane are processed predictive coding within plane and the pixels of other color planes except for the specific color plane are processed predictive coding between planes or within plane by using the pixel values of specific color plane as reference values, and in said modifying step, the predictive errors of other color planes are modified by using the predictive errors of specific color plane as reference values, the specific color plane at said modifying step is G plane, and other color planes are R and B planes, and the modified values of predictive errors of R plane and B plane on the basis of the predictive error of G plane are preliminarily stored in the look-up table, and by referring to the look-up table when coding, the predictive errors of R plane and B plane are modified on the basis of the predictive error of G plane and coded.

7. A reversible coding method comprising:
a predictive coding step of separating color image data into plural planes and processing predictive coding said data within plane or between planes in every plane,
a modifying step of modifying the predictive error data by said predictive coding by using a correlation of predictive errors between planes, and
an entropy coding step of coding by entropy coding of the modified predictive error data and non-modified predictive error data.
wherein the input image data is RGB data, in said predictive coding step, the pixels of specific color plane are processed predictive coding within plane and the pixels of other color planes except for the specific color plane are processed predictive coding between planes or within plane by using the pixel values of specific color plane as reference values, and in said modifying step, the predictive errors of other color planes are modified by using the predictive errors of specific color plane as reference values, the specific color plane is G plane, and other color planes are R and B planes and said modifying step is divided into two stages, that is, at the first stage, the relation of predictive errors between G plane and R plane and between G plane and B plane of all image data is statistically summed up, the modified values of predictive errors of R plane and B plane on the basis of the predictive error of G plane are optimized, and the look-up table is compiled using said modified values, and at the second stage, using this table, the predictive errors of R plane and B plane are modified on the basis of the predictive error of G plane, and the table is attached to the coded data, and coded data is created.

* * * * *